United States Patent [19]

Togashi

[11] Patent Number: 4,638,880
[45] Date of Patent: Jan. 27, 1987

[54] SIDE STAND OF A MOTORCYCLE

[75] Inventor: Toshio Togashi, Akashi, Japan

[73] Assignee: Kawasaki Jukogyo Kabushiki Kaisha, Hyogo, Japan

[21] Appl. No.: 736,350

[22] Filed: May 21, 1985

[30] Foreign Application Priority Data

May 21, 1984 [JP] Japan .................................. 59-103009

[51] Int. Cl.$^4$ .............................................. B62H 1/02
[52] U.S. Cl. ..................................... 180/219; 188/31; 280/293; 280/301
[58] Field of Search ............... 280/293, 295, 296, 297, 280/301, 300, 303, 304; 188/31, 69; 180/219

[56] References Cited

U.S. PATENT DOCUMENTS

| 1,227,635 | 5/1917 | Lake | 280/293 |
| 2,958,537 | 11/1960 | Young | 188/31 |
| 3,908,780 | 9/1975 | McClure | 280/293 |
| 4,010,379 | 3/1977 | Shimamoto | 280/293 |
| 4,181,190 | 1/1980 | Yang | 180/219 |
| 4,264,082 | 4/1981 | Fouchey | 188/31 |
| 4,384,713 | 5/1983 | Deutsch | 188/31 |

FOREIGN PATENT DOCUMENTS

| 183537 | 2/1906 | Fed. Rep. of Germany | 280/293 |
| 2900374 | 8/1979 | Fed. Rep. of Germany | 280/293 |

Primary Examiner—John A. Pekar

[57] ABSTRACT

A side stand of a motorcycle is disclosed, which is equipped with an auxiliary wheel at an end portion thereof which is selectively locked by an operation of a clutch lever of the motorcycle.

8 Claims, 5 Drawing Figures

SIDE STAND OF A MOTORCYCLE

BACKGROUND OF THE INVENTION

The present invention relates to a side stand of a motorcycle and, particularly, such side stand of a heavy motorcycle.

It is usual that a motorcycle for such as touring purpose is large in size and equiped with a number of optional equipments. Therefore, it is very heavy in weight. Consequently, a handling of it in a garage or a parking lot requires considerable labor.

SUMMARY OF THE INVENTION

An object of the present invention is to provide a side stand of a heavy motorcycle which facilitates a handling of the latter in a garage or parking lot.

The side stand according to the present invention is featured by having an auxiliary wheel provided at an end of the side stand. With such side stand having the auxiliary wheel in operation, a driver can move the motorcycle easily and safely without supporting the latter and thus the handling of the motorcycle becomes very easy.

DETAILED DESCRIPTION OF PREFERRED EMBODIMENTS

Figure 1:
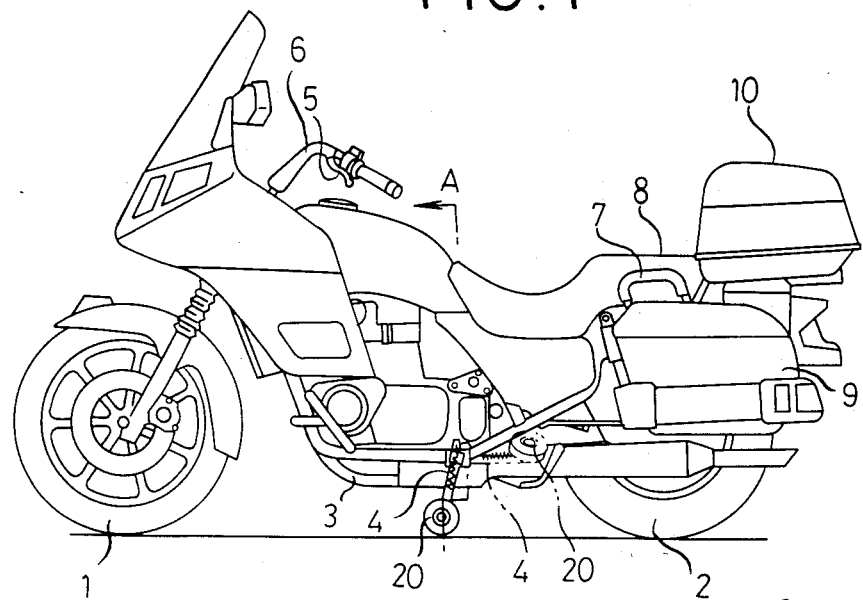
FIG. 1 is a schematic side view of a motorcycle to which the present invention is applied.

In FIG. 1, a motorcycle includes a front wheel 1, a rear wheel 2 and downtubes 3 constituting a frame of the motorcycle. A side stand 4 is pivotably mounted on one of the downtubes 3, which is shiftable between an operative (deployed) position shown in solid lines and an inoperative (stored) position shown by imaginary lines. The motorcycle further includes a clutch lever 5 mounted on a handle 6 to move from a first position to a second position, grip handles 7 provided in both sides of a rear seat 8, side bags 9 and a rear bag 10. The latter two are for touring purpose.

Figure 2:
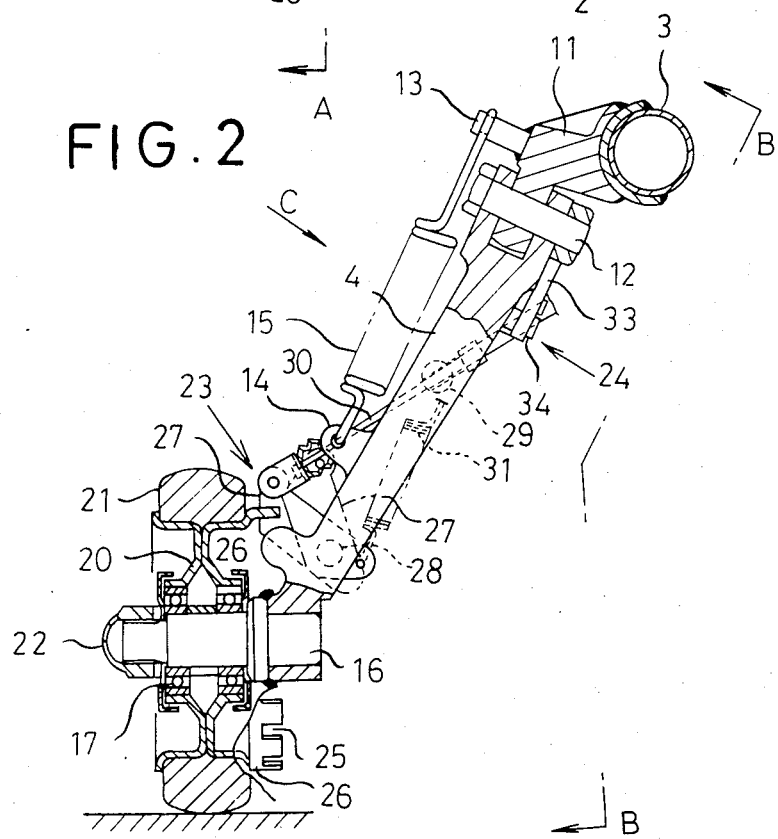
FIG. 2 is an enlarged cross section taken along a line A—A in FIG. 1.

In FIG. 2 which is a cross section taken along a line A—A in FIG. 1 and shows the side stand moving means, a side stand bracket 11 is fixedly secured to the downtubes 3. An upper end portion of the side stand 4 is supported rotatably by the side stand bracket 11 through a pivot bolt 12. The bracket 11 is formed with a spring post 13 and a spring 15 is provided between the spring post 13 and a spring post 14 formed on the side stand 4. The spring 15 functions to hold the side stand 4 in either the operative position or the inoperative position selectively. An auxiliary wheel 20 is rotatably mounted on a lower end portion of the side stand 4 through a shaft 16 and bearings 17. The auxiliary wheel 20 is equipped with a rubber tyre 21 and is prevented, by a cap nut 22 screwed onto an end of the shaft 16, from dropping away.

Figure 3:
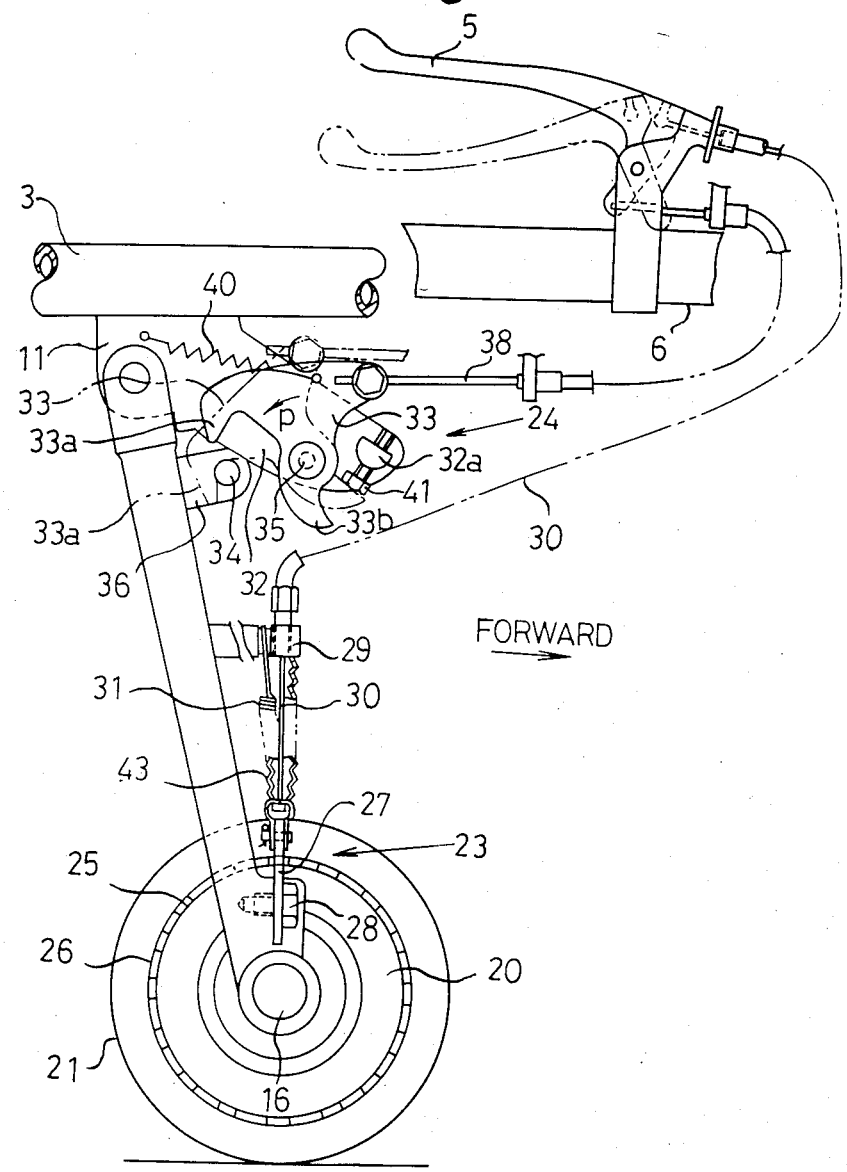
FIG. 3 is a cross section taken along a line B—B in FIG. 2.

A wheel locking means or lock mechanism 23 for the auxiliary wheel and a lock mechanism 24 for the side stand are provided on the side stand 4. The lock mechanism 23 is composed of a holding means includes a lock plate 27 pivotably supported by a bolt 28 extending from the side stand orthogonally of the auxiliary wheel shaft 16 so that the lock plate 27 is selectively engageable with one of notches 25 formed equiangularly in a periphery of an inner annular extension 26 of the auxiliary wheel 20. A spring 31 is provided between an end portion of the lock plate 27 and a pin 29 formed around an intermediate portion of the side stand 4 to bias the lock plate 27 to bring it into a locking position in which it engages with the notch 25. The other end portion of the lock plate 27 is connected through a first wire 30 to the clutch lever 5 as shown in FIG. 3, so that, when the driver actuates the clutch lever 5, the other end of the lock plate 27 is pulled up by the wire 30 to rotate the lock plate 27 clockwisely to thereby disengage the lock plate 27 from the notch 25 of the auxiliary wheel 20. Thus the locking state is released.

In FIG. 3, the bracket 11 has a plate portion 32 extending forwardly and a support shaft 35 is formed in the plate portion 32. The support shaft 35 supports rotatably a lock arm 33 of the side stand lock mechanism 24. The lock arm 33 is formed with a hook portion 33a which is engageable with a lock pin 34 inplanted on a protruded portion 36 of the side stand 4.

One end portion of the lock arm 33 is connected through a second wire 38 to the clutch lever 5 so that, when the clutch lever 5 is actuated, the lock arm 33 is allowed to rotate counterclockwisely as shown by an arrow P in FIG. 3 with an aid of a spring 40 provided between one end portion of the lock arm 33 and the bracket 11 to thereby hook the lock pin 34 by the hook portion 33a thereof.

The lock arm 33 is further formed with a stopper means portion 33b which is engageable with a stopper bolt 41 screwed into a pin portion 32a of the plate portion 32 so that an engaging position of the stopper portion 33b with the stopper bolt 41 is regulatable by regulating the bolt 41.

A bellow 43 is provided to cover a top end portion of the first wire 30.

Figure 4:
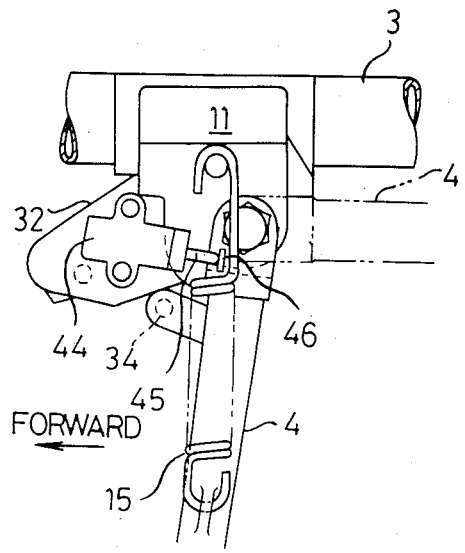
FIG. 4 is a side view of a portion of the side stand shown by an arrow C in FIG. 2.

FIG. 4 is a side view of the portion C of the side stand in FIG. 2, in which a safety switch 44 is mounted on a surface of the plate portion 32. The safety switch 44 has an axially slidable plunger 45. A protruded piece 46 is formed on the upper portion of the side stand 4, with which the plunger 45 is in contact selectively. The safety switch 44 may be connected to an engine ignition device of the motorcycle so that, when the side stand 4 is in the operative position and so the plunger 45 is forced inwardly by the protruded piece 46, the safety switch 44 becomes an off state to prohibit an engine operation and, when the side stand is retracted to the inoperative position and the plunger 45 is allowed to protrude, the safety switch 44 becomes an on state to allow the engine ignition.

Figure 5:
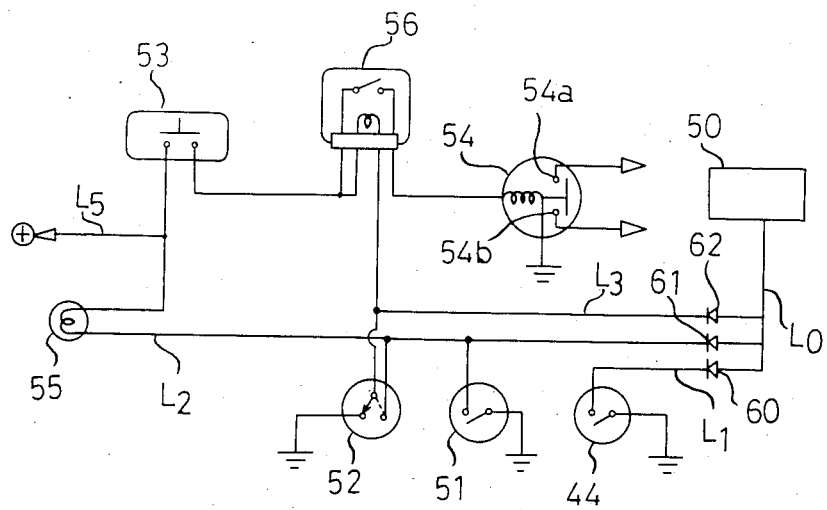
FIG. 5 is a circuit diagram of a safety switch device for indicating when the side stand is inoperative.

FIG. 5 is a circuit diagram of a safety device for the side stand 4 which includes the safety switch 44, a biasing means which includes a neutral switch 51 for preventing the side stand 4 from being turned to the operative position in a driving time of the motorcycle and a clutch switch 52. In FIG. 5, an ignition system 50 is connected through a switch line $L_0$ to a power source so that when the switch line $L_0$ is closed the engine can be ignited. The switch line $L_0$ is composed of three switch circuits $L_1$, $L_2$ and $L_3$ which include diodes 60, 61 and 62 and the associated switches 44, 51 and 52, respectively. The switch 44 is mounted on the plate portion 32 of the bracket 11 and the switches 51 and 52 are mounted on the motorcycle suitably. The switch circuit L₃ is also connected to a relay 56.

As mentioned previously, the switch 44 is turned on when the side stand is retracted to the inoperative position and turned off when the side stand is in use so that an ignition disabling means is provided.

The switch 51 is normally opened except only when a transmission is in a neutral position.

The clutch switch 52 is closed only when the clutch lever 5 is actuated, otherwise connected to the switch line L₂ which is connected through a neutral lamp 55, a starter switch 53 and the relay 56 to an actuation solenoid of a starter motor switch 54. One terminal 54a of the starter switch 54 is connected to a battery (not shown) and the other terminal 54b is connected to a starter motor (not shown). The switch line L2 has a branch L5 which is connected to an ignition switch.

In operation, when it is required to move the motorcycle by hands, the side stand 4 is pulled out and locked in the operative position by grasping the clutch lever 5 so that the lock arm 33 is rotated in the direction P (FIG. 3) by the spring 40 and engaged with the lock pin 34. Therefore, the motorcycle is supported at three points, i.e, the front and rear wheels and the auxiliary wheel 20 of the side stand 4.

Since, simultaneously with the actuation of the clutch lever 5, the lock plate 27 is pulled up by the first wire 30 and disengaged from the notch 25 of the auxiliary wheel, the wheel 20 can rotate freely. Therefore, the motorcycle can be supported by three freely rotatable wheels, causing a movement of the motorcycle to be facilitated.

When the motorcycle is desired to park it is enough to release the clutch lever 5. By releasing the clutch lever 5, the lock plate 27 is forced by the spring 31 to engage with one of the notches 25 to thereby lock the auxiliary wheel 20, as shown in FIG. 2.

Also by releasing the clutch lever 5, the side stand 4 is unlocked by a clockwise rotation of the lock arm 33 against the action of the spring 40 as shown in FIG. 3.

When the side stand 4 is in operation, the engine can not be ignited since the plunger 45 of the safety switch 44 is pushed thereinto. Therefore, a higher level safety is assured.

Although, in the embodiment shown and described hereinbefore, the lock mechanisms 23 and 24 for the auxiliary wheel and the side stand 4 are connected to the clutch lever 5 commonly, it may be possible to control them separately by suitable means.

I claim:

1. A means for supporting a motorcycle comprising:
   a manually operable clutch lever movably mounted on a handle of the motorcycle and adapted to be placed either in a first position or in a second position;
   a side stand pivotally mounted on a frame element of the motorcycle and adapted to be located in a stored location adjacent to the frame element when said clutch lever is in said first position and in a deployed location for supporting the motorcycle when said clutch lever is in said second position;
   side stand moving means connecting said side stand to said clutch lever for moving said side stand from said stored location to said deployed location when said clutch lever is moved from said first position into said second position;
   an auxiliary wheel rotatably mounted on said side stand;
   wheel locking means on said side stand for locking said auxiliary wheel against rotation, said wheel locking means being adapted to be located in a locking position in which rotation of said auxiliary wheel is prevented when said clutch lever is in said first position and in a freeing position in which said auxiliary wheel is free to rotate when said clutch lever is in said second position;
   wheel locking means moving means connecting said wheel locking means to said clutch lever for moving said wheel locking means from said locking position to said freeing position when said clutch lever is moved from said first position into said second position;
   both said side stand moving means and said wheel locking means moving means being connected to said clutch lever to be operated simultaneously so that said auxiliary wheel is freed to rotate simultaneously with the deployment of said side stand into said deployed location and said auxiliary wheel is locked against rotation when said side stand is moved into said stored location.

2. The means defined in claim 1 wherein said wheel locking means further comprises an annular flange mounted coaxially on said auxiliary wheel, said annular flange being formed in a periphery thereof with a plurality of substantially equiangularly separated notches, a lock plate rotatably mounted on said side stand, said lock plate being engageable with any one of said notches, and a first wire means for connecting said plate to said clutch lever; and said side stand moving means further including a lock arm pivotally mounted on said frame element of the motorcycle and which is provided with a hook portion adapted to engage a lock pin fixedly secured to the side stand, and a second wire means for connecting said lock arm to said clutch lever.

3. The means defined in claim 1 further including ignition disabling means mounted on said side stand to cooperate with said side stand locking means and prevent ignition of a motor of the motorcycle when said side stand is in said deployed location.

4. The means defined in claim 3 further including a stopper means on said side stand locking means for limiting movement of said side stand locking means, said stopper means including adjusting means for regulating location of said stopper means.

5. The means defined in claim 3 wherein said ignition disabling means includes an electronic circuit and a plunger which controls operation of said electronic circuit, said circuit including an operating switch on said clutch lever.

6. The means defined in claim 5 wherein said electronic circuit includes a neutral switch for disabling said side stand moving means and preventing said side stand from being moved into said deployed location when the engine of the motorcycle is running.

7. The means defined in claim 6 wherein said neutral switch is connected to the transmission of the motorcycle to permit said side stand moving means to move said side stand into said deployed location only when the motorcycle transmission is in a neutral condition.

8. The means defined in claim 4 further including holding means holding said side stand in said deployed location and in said stored location and biasing means biasing said auxiliary wheel locking means toward said locking position.

* * * * *